United States Patent [19]

Picquendar

[11] Patent Number: 4,472,810
[45] Date of Patent: Sep. 18, 1984

[54] CHARGE-TRANSFER MODULATOR-DEMODULATOR

[75] Inventor: Jean-Edgar Picquendar, Paris, France

[73] Assignee: Thomson-CSF, Paris, France

[21] Appl. No.: 236,129

[22] Filed: Feb. 19, 1981

[30] Foreign Application Priority Data

Feb. 26, 1980 [FR] France ................ 80 04210

[51] Int. Cl.³ .............................................. H03H 7/30
[52] U.S. Cl. ......................................... 375/8; 375/103;
333/165; 364/724
[58] Field of Search ..................... 375/7, 8, 60, 103, 9;
179/2 DP; 364/724, 824; 333/165, 166;
307/221 D; 332/9 R, 9 T; 455/108, 120, 121;
375/62, 45, 83

[56] References Cited

U.S. PATENT DOCUMENTS

| | | | |
|---|---|---|---|
| 3,655,915 | 4/1972 | Liberman et al. | 179/2 DP |
| 3,794,928 | 2/1974 | Stump et al. | 375/81 |
| 4,145,675 | 3/1979 | Picquendar | 333/165 |
| 4,257,019 | 3/1981 | Gonin et al. | 307/221 D |
| 4,270,027 | 5/1981 | Agrawal et al. | 179/2 DP |
| 4,330,687 | 5/1982 | Foulkes et al. | 375/9 |
| 4,336,613 | 6/1982 | Hewes | 375/9 |

FOREIGN PATENT DOCUMENTS 2414835 10/1979 France ................................ 375/9

OTHER PUBLICATIONS

Halijak, "From Switched—Capacitor to Digital Filter", Jun. 20, 1979, Computer and Electrical Engineering, Vol. 6, pp. 153–157.

*Primary Examiner*—Robert L. Griffin
*Assistant Examiner*—Stephen Chin
*Attorney, Agent, or Firm*—Roland Plottel

[57] ABSTRACT

The output filters of the modulator and of the demodulator, the input filter of the demodulator are transverse charge-transfer filter whose weighting coefficients are determined by the result of the division between the numerator and the denominator of the recursive charge-transfer filter having the desired passband characteristic, the number of the coefficients which the transverse filter comprises being limited.

4 Claims, 6 Drawing Figures

MODULATOR

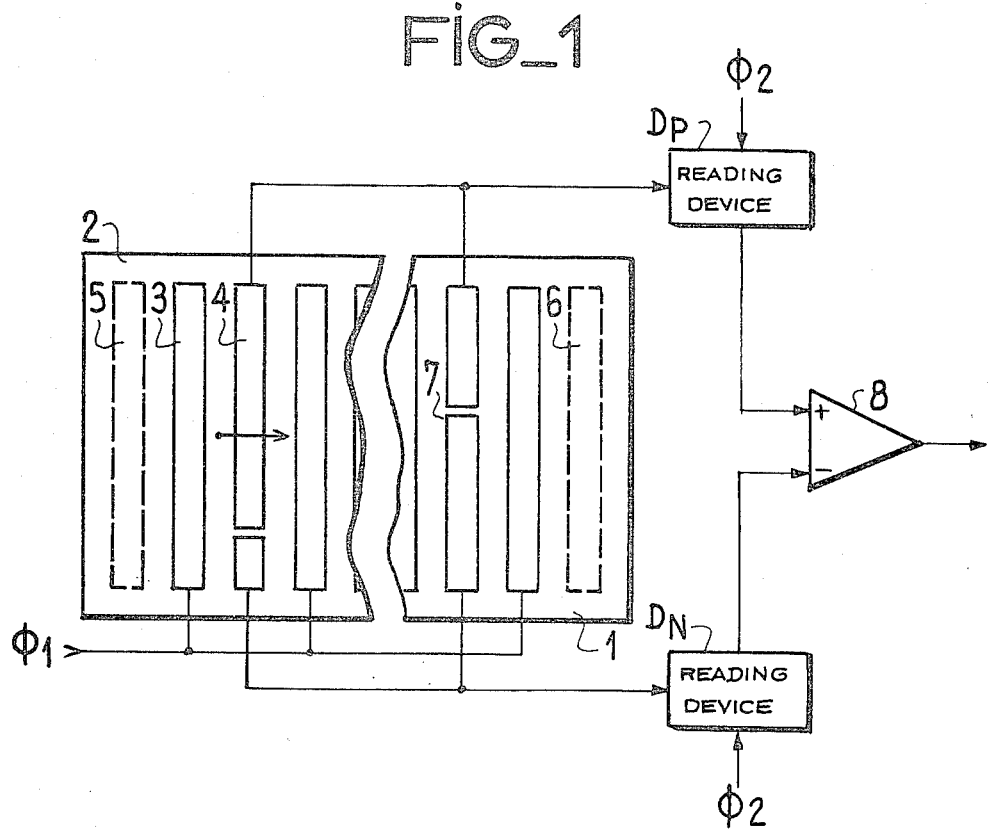
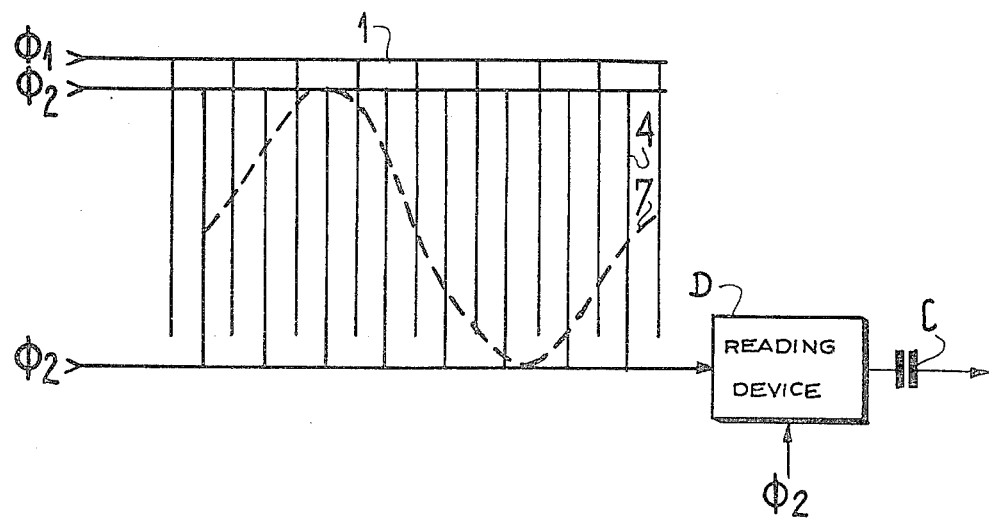

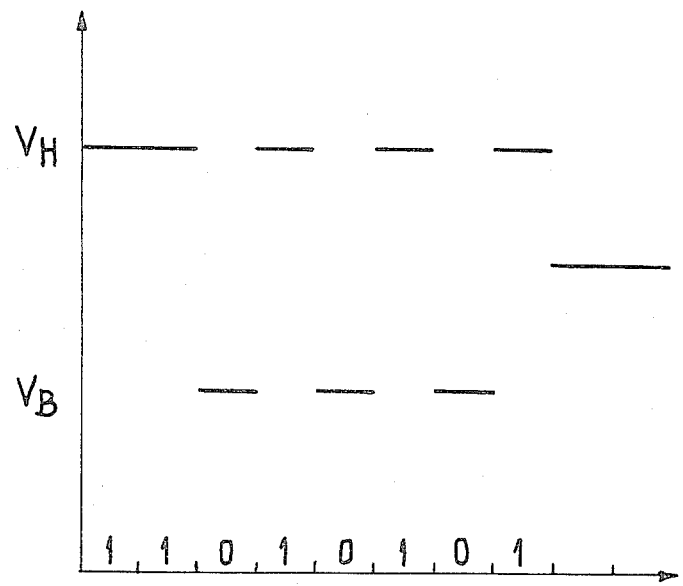
FIG_3-A
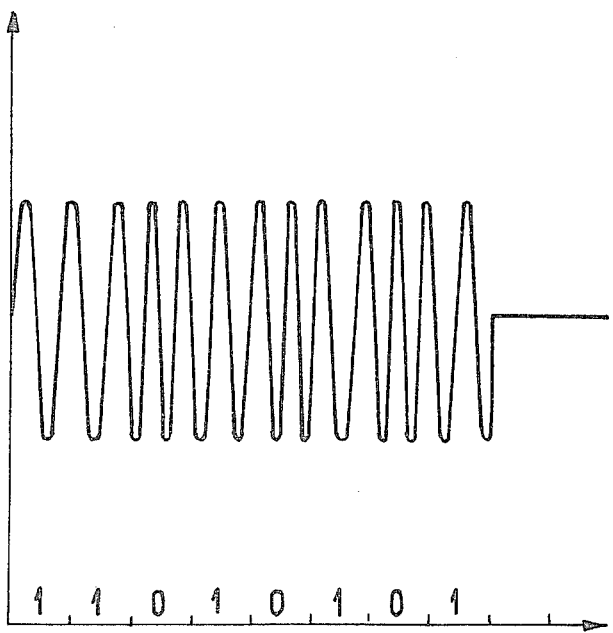
FIG_3-B

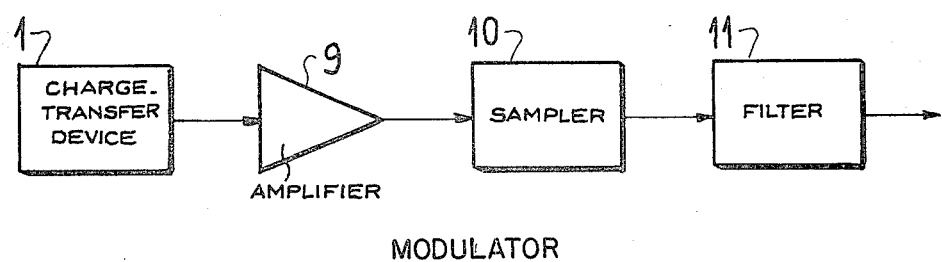
MODULATOR
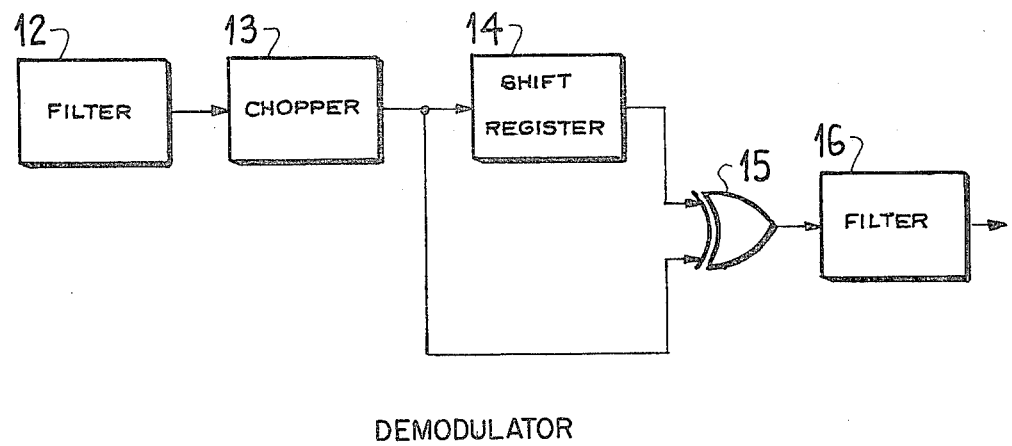
DEMODULATOR

CHARGE-TRANSFER MODULATOR-DEMODULATOR

BACKGROUND OF THE INVENTION

The present invention relates to a charge-transfer modulator-demodulator.

It will be recalled that a modulator-demodulator, currently called modem, comprises:

a modulator which converts a random succession of binary signals equal to 0 or 1 into a periodic analog signal, modulated in frequency, in amplitude or in phase, and transmissible by means of the telephone network;

a demodulator which converts the modulated analog signal supplied by the network into a succession of 0 and 1.

The present invention relates to frequency-modulation modems which are known under the English name of Frequency Shift Keying or FSK.

In FSK modems, the modulator causes a sine curve at frequency $F_A$ to correspond to a zero and the modulator causes a sine curve $F_Z$ to correspond to a one.

The present invention relates to asynchronous FSK modems, i.e. in which passing over from the frequency $F_A$ to the frequency $F_Z$ and vice versa takes place at any moment in the period of the analog signal.

The specifications of the CCITT lay down all the characteristics of modems, thus a 1200-baud modem has been studied for which $F_A = 2100$ Hz and $F_Z = 1300$ Hz. This modem will be cited by way of example in what follows.

In asynchronous FSK modems, the linking up of the sine curves at frequencies $F_A$ and $F_Z$ must take place perfectly whatever the moment when it occurs.

For that, modulators are known in the prior art which only comprise a single oscillator at a multiple frequency of $F_A$ and $F_Z$. Thus, in the case where $F_A = 2100$ Hz and $F_Z = 1300$ Hz, the oscillator delivers $100 \times 13 \times 21$ Hz. The signal delivered by the oscillator is chopped then fed into a logic frequency divider which enables 1300 or 2100 Hz to be produced with a perfect linking up of the analog signals supplied.

To further minimize the parasites caused by the frequency change, an oscillator is used producing $(100 \times 13 \times 21)$ Hz, where k is of the order of ten. The linking then takes place between analog signals at frequencies k.1300 Hz and k.2100 Hz. These signals are then fed to a programmable function generator which comprises k successive states and which enables a substantially sinusoidal 1300 or 2100 Hz sampled signal to be recovered.

There is also known from French patent application No. 78.19141 published under the No. 2.414.835 in the name of Texas Instruments, a modulator for an FSK modem (FIGS. 17 and 18), which comprises a programmable function generator formed from capacitors $C_A$ to $C_G$ switched by MOS transistors connected as inverters INV 1 to INV 7. The inverter-transistors are controlled by exciter MOS transistors $S_1$ to $S_7$ connected to a shift register.

By controlling the shift register, a sampled signal is synthesized which is substantially sinusoidal at two distinct frequencies $F_A$ and $F_Z$.

The modulators for FSK asynchronous modems of the prior art present the disadvantage of being integrable only with difficulty for they comprise either a quartz oscillator or numerous capacitors of high values. These modulators also present the disadvantage of being costly to produce.

SUMMARY OF THE INVENTION

The present invention relates to a modulator for asynchronous FSK modem which is easily integrable and inexpensive.

This modulator comprises a charge-transfer device which comprises k storage electrodes, separated into two parts by a cut in the charge-transfer direction. The cuts are positioned so that reading of the charges of each of the storage electrodes, during transfer of a quantity of charges injected into the device under this electrode, gives a current or a voltage corresponding to the k sampled values over a period of the analog signal to be elaborated. Reading of the charges takes place at a frequency equal to $k.F_A$ for elaborating the analog signal at frequency $F_A$ corresponding to a zero or to a frequency equal to $k.F_Z$ for elaborating the analog signal at frequency $F_Z$ corresponding to a one.

DESCRIPTION OF THE DRAWINGS

Other objects, characteristics and results of the invention will become clear from the following description given by way of nonlimiting example and illustrated by the accompanying drawings in which:

FIGS. 1 and 2 show two embodiments of the modulator of the invention;

FIGS. 3a and 3b show respectively a succession of binary signals equal to 0 or to 1 and the frequency-modulated signal obtained by the modulator of the invention;

FIGS. 4 and 5 show block diagrams respectively of a modulator and of a demodulator comprising charge-transfer filters in accordance with the invention.

In the different figures, the same references designate the same elements but, for the sake of clarity, the sizes and proportions of the different elements are not respected.

DESCRIPTION OF THE PREFERRED EMBODIMENTS

FIGS. 1 and 2 show two embodiments of the modulator of the invention.

This modulator comprises a charge-transfer device 1 which is represented seen from above in FIGS. 1 and 2.

Charge-transfer devices, which are well-known in the prior art, are formed from a semiconductor substrate coated with an insulating layer 2 on which alternate transfer electrodes 3 and charge-storage electrodes 4, disposed perpendicularly to the charge-transfer direction shown by an arrow.

At both ends of the device, two diodes 5 and 6 ensure respectively the injection into the substrate of electric charges, which are the minority carriers of the substrate and removal of these charges.

On application to the transfer and storage electrodes of clock signals $\phi_1$ and $\phi_2$, of the same period but in phase opposition, there is transfer of charges from one storage electrode to the next.

For there to be continuity of the potentials created in the semiconductor substrate under the electrodes and for there to be a single charge-transfer direction, the storage electrodes are disposed on a thicker insulating portion.

This thicker insulating portion may be replaced by overdoping of the substrate by implantation of ions which ensure the same functions.

Similarly, the description is made in the case of the charge-transfer device with two phases $\phi_1$ and $\phi_2$, but the invention also applies to three-phase charge-transfer devices for example.

The storage electrodes 4 are separated into at least two parts by a cut 7 disposed in the charge-transfer direction.

When charges arrive under a storage electrode, the charges stored under each part of this electrode are read by a charge-reading device $D_P$ and $D_N$, as is shown in FIG. 1.

The charge-reading devices $D_P$ and $D_N$ are connected to a differential amplifier 8 which enables a positively or negatively weighted signal to be obtained depending on the position of cut 7.

Current or voltage charge-reading devices are well-known in the prior art, particularly from U.S. Pat. No. 4,377,760 corresponding to the French patent application No. 77.13857 published under the No. 2 389 899 in the name of Thomson-CSF.

According to the invention, the charge-transfer device comprises k storage electrodes 4 whose cuts 7 are positioned so that reading of the charges under each of these electrodes, when there is a transfer of a quantity of charges injected by diode 5 under this electrode, enables k sampled values to be obtained over a period of the analog signal to be elaborated by the modulator; this analog signal is generally a sine curve.

Reading of the charges under these k storage electrodes takes place at frequency $k.F_A$ for elaborating the analog signal at frequency $F_A$ which corresponds to a zero and at $k.F_Z$ for elaborating the analog signal at frequency $F_Z$ which corresponds to a 1.

It can then be seen that it is sufficient to change the frequency of the clock signals $\phi_1$ and $\phi_2$ for the frequency of the analog signal supplied by the modulator to be modified.

The number k of samples per period of the analog signals to be elaborated must be chosen sufficiently large to satisfy Nyquist's theorem. It can be seen that the increase in the value of k presents no problem from the practical constructional point of view since it only results in an increase in the number of storage electrodes.

Thus for $F_A=2100$ Hz and $F_Z=1300$ Hz, k may be chosen equal to 24.

Reading of the charges may take place in two different ways.

There may be injected at frequency $F_A$ or $F_Z$ a single quantity of charges which is read when it arrives under each storage electrode, the transfer from one storage electrode to the next taking place at the frequency $k.F_A$ or $k.F_Z$.

A few quantities of charges—three or four for example for k equal to 24—may also be injected at the frequency $k.F_A$ or $k.F_Z$, and this series of injections may be begun again at frequency $F_A$ or $F_Z$. The transfer from one storage electrode to the next always take place at frequency $k.F_A$ or $k.F_Z$ and reading of the charges is then carried out under three or four storage electrodes at the same time. The partial integral of the desired sine curve is then obtained.

FIG. 2 shows, more schematically than in FIG. 1, another embodiment of the modulator of the invention.

In the case of FIG. 1, there is obtained at the output of differential amplifier 8 positive or negative values corresponding to the sampled values of the analog signal to be elaborated which is generally a sine curve.

In the case of FIG. 2, we have restricted ourselves to the elaboration of positive values.

The modulator of the invention is then simplified since it now comprises only a single charge-reading device D connected to a part of each storage electrode 4.

The differential amplifier 8 is then omitted, which is advantageous for the differential amplifier is cumbersome and difficult to integrate.

Instead of elaborating a sinusoidal analog signal, a sinusoidal signal is then obtained superimposed on a continuous component $a_o$ which it is easy to eliminate by means of a capacitor C following reading device D.

The effective length (i.e. that under which reading takes place) of the storage electrodes of row j is then equal to: $a_o + \sin(2\pi j/k)$.

In FIG. 2, the transfer and storage electrodes of the charge-transfer device have only been shown schematically. The cuts of the storage electrodes have been joined up by a broken line and thus the trend of the analog signal elaborated is obtained.

FIGS. 3a and b show respectively a succession of binary signals equal to 0 or to 1 and the frequency-modulated signal obtained by the modulator of the invention.

If we consider that the high level $V_H$ of the signal shown in FIG. 3a represents a one and that the low level $V_B$ represents a zero, it can be seen that the succession shown in FIG. 3a comprises the following signals: 1 1 0 1 0 1 0 1.

FIG. 3b shows the frequency-modulated signal obtained by the modulator of the invention which is simulated in a computer.

FIGS. 4 and 5 finally show block diagrams respectively of a modulator and a demodulator comprising charge-transfer filters in accordance with the invention.

The modulator is formed by a charge-transfer device 1, such as that shown in FIGS. 1 and 2, which is followed by an amplifier 9, a 0 order sampler 10 and finally a passband filter 11.

The output filter of the modulator, in the case of the 1200-baud modem taken as example, must let pass therethrough about 500 to 4000 Hz for this modem operates in duplex (i.e. using simultaneously the same line) with another 75-baud modem for which: $F_A=450$ Hz and $F_Z=390$ Hz.

The input filter of the demodulator referenced at 12 in FIG. 5 has the same characteristics as the output filter of the modulator.

It is known in the prior art to construct such filters by connecting in series two active filters; a high-pass filter from 500 Hz and a low-pass filter up to 4000 Hz.

Such filters have also been constructed by using recursive charge-transfer filters. It will be recalled that in a recursive filter there is reinjection of the output signal at the input of the filter, generally after a phase shift of 180° to avoid oscillation.

The embodiments of the prior art of the output filter of the modulator and of the input filter of the demodulator are not satisfactory for active filters are cumbersome and cannot be integrated and recursive charge-transfer filters are difficult to construct and in particular require great accuracy insofar as the value of the weighting coefficients is concerned.

The output filter of the modulator and the input filter of the demodulator in accordance with the invention are transverse (i.e. non-recursive) charge-transfer filters whose weighting coefficients are determined by the result of the division between the numerator and the denominator of the recursive charge-transfer filter having the desired passband characteristic. The number of coefficients provided by the transverse filter is limted to about fifty. If the z transfer function of the recursive filter is written: $P(z)/Q(z)$, the result of the division of $P(z)$ by $Q(z)$ gives a polynomial comprising an infinite number of coefficients which is limited for the transverse filter to obtaining the first n coefficients:

$$P(z)/Q(z) = a_0 + a_1 z + \ldots + a_n z^n + \ldots$$

The filters of the invention enable characteristics to be obtained close to those of recursive filters and have the advantage of being much more easily constructed.

The demodulator shown in FIG. 5 comprises, after the passband filter 12, a chopper 13 for chopping the sinusoidal signal received from the telephone line.

The product is then obtained of the signal coming directly from the chopper and of this signal delayed by a delay $\tau$ by means of a shift register 14.

By choosing the delay $\tau$ such that $\phi = \Omega_C \cdot \tau = \pi/2$ with: $F_C = \omega_C/2\pi = F_A - f_o = F_Z + f_o$, at the output of multiplier 15, the signals at $F_A$ and $F_Z$ are superimposed on DC voltages which are equal but of opposite signs and it is thus possible to detect them and to transform the analog signal received from the line into a succession of 0 and 1.

For $F_A = 2100$ and $F_Z = 1300$ Hz, the frequency $F_C$ is equal to 1700 Hz and $\tau$ is equal to 150 $\mu$s.

To provide such a large delay, a charge-transfer shift register 14 may be used. Furthermore, the multiplication of signals squared by the chopper may be very simply provided by an "exclusive OR" gate 15.

After the "exclusive OR" gate, we find a filter 16 which improves the trend of the binary signal transmitted. The output filter 16 of the demodulator may be, like the output filter 11 of the modulator and like the input filter 12 of the demodulator, a charge-transfer transverse filter which comprises the first n coefficients resulting from the division of $P'(z)$ by $Q'(z)$, with $P'(z)/Q'(z)$ the z transfer function of the recursive charge-transfer filter having the desired characteristic.

What is claimed is:

1. In a charge-transfer modulator-demodulator formed by a modulator ensuring the conversion of a random succession of binary signals equal to 0 or 1 into a periodic analog signal at two different frequencies, $F_A$ and $F_Z$, and a demodulator ensuring the conversion of the analog signal at frequencies $F_A$ and $F_Z$ into a succession of 0 and 1, an output band pass filter connected at an output of the modulator and an input bandpass filter connected at the input of the demodulator, said output bandpass filter and said input bandpass filter are transverse charge-transfer filters whose weighting coefficients are determined by the result of the division between the numerator and denominator of a Z transfer function of a recursive charge-transfer filter having the desired bandpass characteristic of said output bandpass filter or said input bandpass filter, and the number of weighting coefficients which the transverse transfer charge-filter comprises being limited.

2. The modulator-demodulator as claimed in claim 1, wherein these transverse filters comprise about fifty coefficients.

3. The modulator-demodulator as claimed in claim 1, wherein the demodulator comprises a bandpass filter; a chopper having its input connected to an output of the filter; an exclusive-OR circuit having one input connected to an output of the chopper; and a charge transfer shift register connected between the output of the chopper and a second input to the OR circuit for delaying a signal from the chopper by $t = (\pi/2)(1/w_c)$, where $w_c = 2\pi(F_A - F_o) = 2\pi(F_Z - F_o)$, said OR circuit providing multiplication between a signal from the chopper and the same signal delayed by the shift register.

4. The modulator-demodulator as claimed in claim 3, wherein the demodulator comprises a transverse charge-transfer output filter whose weighting coefficients are determined by the result of the division between the numerator and the denominator of a Z transfer function of the recursive charge-transfer filter having the desired bandpass characteristic of the said demodulator transverse charge-transfer output filter, the number of weighting coefficients which the transverse filters comprises being limited.

* * * * *